April 16, 1940.                    K. FRITZ                    2,197,338
                       ELECTROMAGNETIC MICROWAVE SYSTEM
                           Filed April 27, 1937
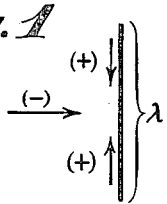
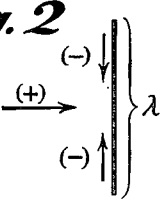
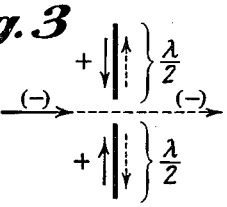
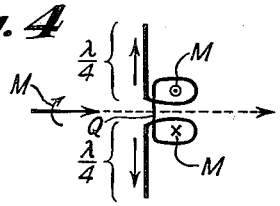
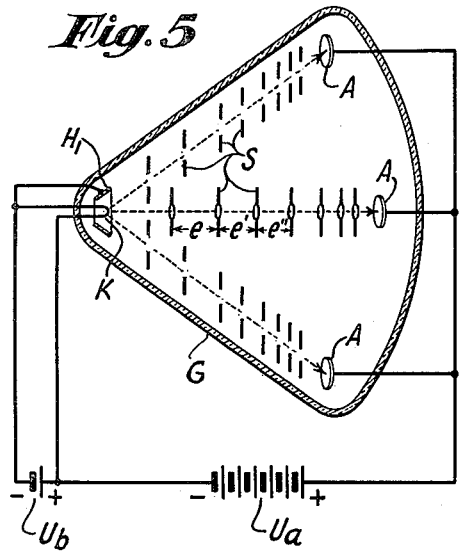
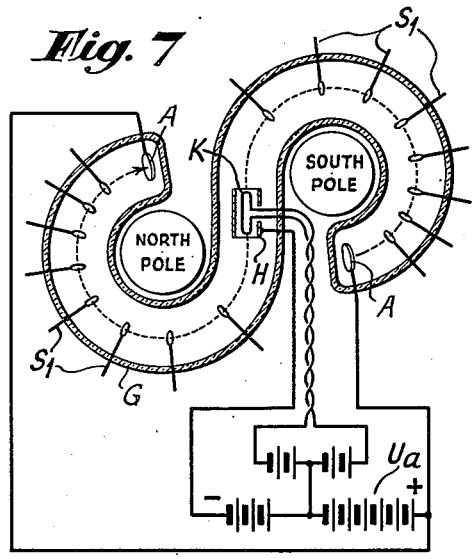
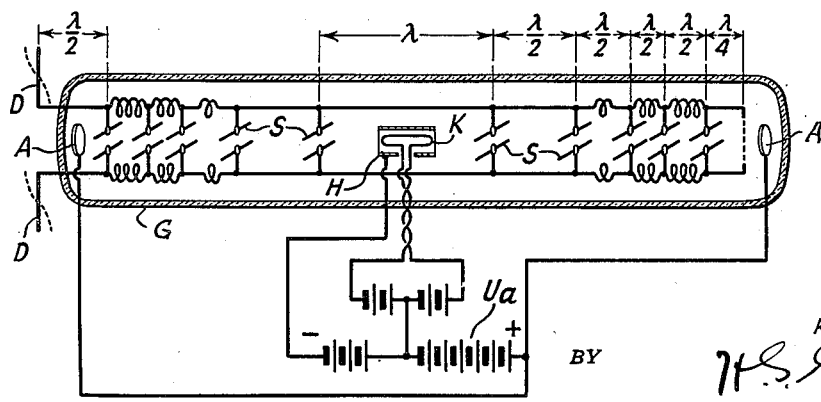
INVENTOR.
KARL FRITZ
BY
ATTORNEY.

Patented Apr. 16, 1940

2,197,338

UNITED STATES PATENT OFFICE

2,197,338

ELECTROMAGNETIC MICROWAVE SYSTEM

Karl Fritz, Berlin, Germany, assignor to Telefunken Gesellschaft für Drahtlose Telegraphie m. b. H., Berlin, Germany, a corporation of Germany Application April 27, 1937, Serial No. 139,212
In Germany April 27, 1936

5 Claims. (Cl. 250—36)

The present invention relates to a type of impulse generator using several resonant networks for the production of waves of the order of one millimeter.

Spark gap generators are known in which a series of small bodies capable of resonance, such as spherical bodies, have their natural wave generated by means of spark discharges propagating over all bodies capable of resonance. In spherical bodies the radiation is extremely low, while as energy collectors, they have appeared to be quite useless because there was no known method of transferring the collected energy to a utilization device.

The following description of my invention will be made clearer by reference to the accompanying drawing in which Figures 1 to 4 inclusive show different diagrams of a moving charge and its influence upon one or more conductors, Fig. 5 illustrates schematically one arrangement for carrying out the invention, Fig. 6 represents an embodiment of the invention including an energy-coupled generator, and Fig. 7 illustrates a device which provides a curved path for the charge carrier, as will be hereinafter explained in detail.

In the present invention the phenomenon is utilized that an electrical charge, when approaching a conductor extending substantially at right angle to the direction of movement of the charge, creates currents on the conductor by way of influence, and said currents are directed to the point towards which the charge moves. The signs and directions of the currents are opposite to the sign of the moved charge (Figs. 1 and 2). Now, if these currents are caused, while they exist, to produce work anywhere and in any manner through a resistor, or through radiation, then a phase displacement takes place between the field variation caused by the movement of the charge, and the resultant field of the charge due to influence. This phase displacement causes a retarding of the moved elementary charges and, therefore, a delivery of energy to the structure capable of resonance, analogous to the time advance of the driving alternating field or rotary field relative to the counter E. M. F. in a rotor of an asynchronous A. C. motor.

In order better to utilize the kinetic energy of the moving charge, the charge instead of impinging on the conductor should, in accordance with the invention, be caused to fly closely past the conductor and with a component of movement extending as much as possible at a right angle to the largest dimension of the conductor. When choosing rod-shaped conductors, for instance, as members capable of resonance, the latter can be excited in their full or half wave length depending on their arrangement in the direction of flight of the charge. Fig. 3 illustrates a case that can be quite readily put into practice. The charges move at a right angle to the axis of the conductors and past the adjacent ends thereof.

The course described by a flying charge can be considered as a kind of current thread. Thus, it is also possible to utilize for the excitation of oscillations, the magnetic coupling between the magnetic field lines produced by the flying charge and a conductor extended partially in parallel to the course of flight.

An example is shown in Fig. 4. The magnetic lines of force M surround the charge in the form of concentric circular tracks extending at right angles to the direction of movement. Now, if a current is to be induced in the conductor, the latter must be coupled with a magnetic flux. In Fig. 4, for instance, two conductor loops frame-in the path of the charge. The electrically effective length of the loops is preferably chosen as λ/4, and the straight parts of the conductors are likewise of a length λ/4, so that a total length equal to λ will be obtained. At the point Q a current node will occur. From this place on the current passes into or comes from opposite directions. At the ends of the straight parts of the conductors, current nodes, or voltage nodes are likewise formed.

My novel method of producing very short electro-magnetic waves is characterized by the use of surface like or bodily shaped conductors capable of resonance and which have an appreciable dimension in one direction only. These conductors are excited or set into the state of oscillation by moving elementary charges. It is essential that the elementary charges be caused to deliver their energy in the form of impulses so as to develop the desired oscillations.

In order to attain a favorable efficiency the method is carried out in such manner that there exists a coherence between the duration of the impulse and the time cycle of oscillation of the excited oscillations. Thus, a coherence between the impulse frequency and the excited frequency is obtained, which has a favorable effect upon the production of the oscillations in that it provides a fair degree of frequency stabilization.

Figs. 5, 6 and 7 show schematically, by way of example, modes of construction in accordance with the idea of the invention. An arrangement of multiple radiators is shown. Structures of primarily linear shape and capable of resonance are suitably dimensioned and arranged, so that oscillations can be produced of any frequency, preferably of frequencies that are approximately equal to each other, and in the first place oscillations having the same direction of polarization.

Fig. 5 shows a number of individual radiators S each having the length λ/2. They are not connected with each other conductively, or otherwise, as regards high frequency, but are disposed at various distances from each other designated by e, e', e'' . . . between a source K of elementary charges, and one or more absorption electrodes A. The member H₁ acts as a directive reflector. The distances between the individual radiators decrease uniformly from K towards A. The stepping down is necessary in order to compensate for the velocity decrease of the charges during their flight from K towards A. In the case represented, all individual radiators should have the same natural frequency.

The arrangement, according to Fig. 5, may likewise be modified in accordance with Fig. 4 where it would be considered an advantage to utilize the magnetic coupling between the moving charge and a conductor loop.

Fig. 6 represents an energy coupled generator with multiple excitation. Several bodies capable of resonance and having the same natural frequency are disposed in using a power line, at uniformly decreasing or uniformly increasing distances, whereby the bodies capable of resonance form at the same time parts of the energy line. The end of the energy line may be connected to a load such as a dipole D. The construction of the energy collectors and the connection of the same to energy lines is clearly shown in Fig. 6. The energy collectors are denoted S. Their connections with the energy line are preferably made at different points which in one case are separated by a full wave length and in other cases by a half wave length. Between the points of connection of the collectors to the energy line different reactances may be interposed. These reactances are here shown as inductances by which the circuit itself may be tuned. The assembly of parts within the envelope of the tube includes a cathode K, which is preferably surrounded by a tubular electrode H, which is open-ended so that the electronic emission may be directed in beams toward the energy collectors S. The tube also contains two targets A one at each end for attracting the electronic emission.

In an arrangement, according to Fig. 7, the path of the charge carrier is curved by the addition of a magnetic field. The excited bodies S₁ need not be connected with each other as regards high frequency. They may even have different orientations in space. The radiated oscillations are then polarized in a circle. However, the excited oscillations, according to Fig. 6, may be collected with the aid of an energy line and brought into action in concentrated form.

As already pointed out in the beginning, the idea of the invention can best be practised when the elementary charges deliver the energy in pulses. Therefore, sources of original elementary discharges such as cathodes may be used which act quickly and with a minimum of inertia, and have a super-normal emission while they are in action. The method, according to the invention, can be applied in particular to research, to distance measurements, and in cases in which a distance release of a secondary action is to be obtained by means of short wave radiations having a very high concentration.

Now, in order to be able to produce larger energies to act in the form of impulses, it will be necessary to cause a brief action of excessively loaded cathodes. Ordinary glow cathodes are not well suited for this purpose in view of their heat inertia. Hence, it is advisable to use a primary and a controlled secondary source of charges. For instance, the primary electrons appearing at a spark discharge may be used for releasing secondary electrons.

The discharge arrangements shown in each of Figs. 5, 6 and 7 are enclosed within gas-tight, but radiation permeable vessels G. The electrodes and energy collectors suitable for producing radiant energy at the working frequency are contained within these vessels and are mounted in any suitable manner in the positions shown.

I claim:

1. An ultra-short wave radio system comprising a plurality of linear conductors disposed parallel to one another and each resonant to a given frequency, means for energizing said conductors successively, said means comprising a source of charged free molecules, and means for causing said molecules to traverse zones occupied by the ends of said conductors, thereby to set up oscillations in said conductors.

2. A system in accordance with claim 1 and having means for causing said source of free molecules to deliver energy in the form of pulses.

3. The method of generating oscillations in a plurality of linear radiators disposed in parallelism which comprises projecting elementary charges past the ends of said radiators, and causing said charges to pass different radiators successively and in pulses having a harmonic relation to the natural resonant frequency of said radiators.

4. The method of electro-magnetically exciting a plurality of linear antennas which are disposed parallel to one another and which have a resonant characteristic suitable for the generation of micro-waves, which comprises emitting a stream of charged particles past the ends of said antennas and in a general direction perpendicular to the respective axes of said antennas, thereby to transfer the charges from said particles to said antennas.

5. The method as defined in claim 4 and including the step of emitting said particles in periodic pulses having a time factor which bears a harmonic relation to the natural resonant frequency of said antennas.

KARL FRITZ.